United States Patent
St. Lawrence et al.

(10) Patent No.: US 6,761,834 B2
(45) Date of Patent: Jul. 13, 2004

(54) ELECTROSTATIC DEPOSITION OF HIGH TEMPERATURE, HIGH PERFORMANCE LIQUID CRYSTALLINE POLYMERS

(75) Inventors: Michael St. Lawrence, Thompson, CT (US); Ki-Soo Kim, Ashford, CT (US); Saroj Roy, Danielson, CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 09/957,648

(22) Filed: Sep. 20, 2001

(65) Prior Publication Data

US 2002/0104982 A1 Aug. 8, 2002

Related U.S. Application Data

(60) Provisional application No. 60/234,071, filed on Sep. 20, 2000.

(51) Int. Cl.$^7$ ............................................. C09K 19/52
(52) U.S. Cl. ....................... 252/299.01; 428/1; 427/485
(58) Field of Search .................. 252/299.01–299.7; 428/1; 427/485

(56) References Cited

U.S. PATENT DOCUMENTS

| | | | |
|---|---|---|---|
| 4,394,498 A | * | 7/1983 | Kastelic ..................... 528/193 |
| 4,702,932 A | * | 10/1987 | Cosentino et al. ............. 427/33 |
| 4,737,398 A | | 4/1988 | Ikenaga et al. .............. 428/216 |
| 4,772,422 A | | 9/1988 | Hijikata et al. .............. 252/511 |
| 4,863,767 A | | 9/1989 | Garg et al. ..................... 428/1 |
| 4,871,595 A | | 10/1989 | Lusignea et al. ............... 428/1 |
| 4,876,120 A | | 10/1989 | Belke et al. .................... 428/1 |
| 4,942,095 A | | 7/1990 | Buchert et al. .............. 428/461 |
| 4,963,428 A | | 10/1990 | Harvey et al. ............... 428/220 |
| 4,966,806 A | | 10/1990 | Lusignea et al. ........... 428/220 |
| 4,966,807 A | | 10/1990 | Harvey et al. ............... 428/220 |
| 4,975,312 A | | 12/1990 | Lusignea et al. ........... 428/209 |
| 5,137,766 A | | 8/1992 | Mazanek et al. .............. 428/68 |
| 5,164,458 A | | 11/1992 | Jennings et al. ............. 525/389 |
| 5,176,775 A | | 1/1993 | Montsinger .................. 156/181 |
| 5,259,110 A | | 11/1993 | Bross et al. .................... 29/830 |
| 5,288,529 A | | 2/1994 | Harvey et al. .................. 428/1 |
| 5,360,672 A | | 11/1994 | Saito et al. .................. 428/480 |
| 5,529,740 A | | 6/1996 | Jester et al. ................. 264/317 |
| 5,585,426 A | * | 12/1996 | Williams et al. ............. 524/366 |
| 5,686,176 A | | 11/1997 | Adam et al. ................. 428/327 |

(List continued on next page.)

FOREIGN PATENT DOCUMENTS

| | | |
|---|---|---|
| CA | 2273542 | 6/1998 |
| EP | 0484818 A2 | 5/1992 |
| EP | 0507332 A2 | 7/1992 |
| EP | 0697278 B1 | 2/1996 |
| EP | 0 964 035 | 5/1999 |
| EP | 0949067 A2 | 10/1999 |
| EP | 1044800 A1 | 10/2000 |
| JP | 4367763 | 12/1992 |
| JP | 065097614 | 4/1994 |
| JP | Hei 7-3033 | 1/1995 |
| JP | 7-3033 | 1/1995 |
| JP | 2000070630 | 3/2000 |
| JP | P2000-280341 A | 10/2000 |
| JP | P2001-244630 A | 7/2001 |
| WO | WO 96/08361 | 3/1996 |
| WO | WO 97/19127 | 5/1997 |

*Primary Examiner*—Mark F. Huff
*Assistant Examiner*—Jennifer R. Sadula
(74) *Attorney, Agent, or Firm*—Cantor Colburn LLP

(57) ABSTRACT

A process to produce a liquid crystalline polymer film comprises electrostatically depositing a fine powder of liquid crystalline polymer resin onto a carrier and fusing the deposited fine powder to form a liquid crystalline polymer film that is isotropic in the x-y plane. The electrostatic deposition of the resin particles results in a substantially random molecular alignment of the liquid crystalline polymer. The carrier can comprise an all metal foil, a metal foil laminate, a polymer film material, or a release material.

46 Claims, 1 Drawing Sheet

U.S. PATENT DOCUMENTS

| | | | |
|---|---|---|---|
| 5,703,302 A | 12/1997 | Jester et al. | 528/481 |
| 5,719,354 A | 2/1998 | Jester et al. | 174/255 |
| 5,834,072 A | 11/1998 | Schonfeld et al. | 428/1 |
| 5,837,160 A * | 11/1998 | Dietz et al. | 252/299.01 |
| 5,844,036 A | 12/1998 | Hughes | 524/494 |
| 5,863,405 A | 1/1999 | Miyashita | 205/125 |
| 5,863,666 A | 1/1999 | Merchant et al. | 428/544 |
| 5,900,292 A | 5/1999 | Moriya | 428/1 |
| 5,997,765 A | 12/1999 | Furuta et al. | 252/299.01 |
| 6,027,771 A * | 2/2000 | Moriya | 428/1 |
| 6,153,722 A * | 11/2000 | Schoenfeld et al. | 252/299.1 |
| 6,274,242 B1 | 8/2001 | Onodera et al. | 428/411.1 |
| 6,403,211 B1 | 6/2002 | Yang et al. | 428/308.4 |
| 2002/0028293 A1 | 3/2002 | Yang et al. | 427/304 |
| 2002/0037397 A1 | 3/2002 | Suzuki et al. | 428/209 |

* cited by examiner

US 6,761,834 B2

ELECTROSTATIC DEPOSITION OF HIGH TEMPERATURE, HIGH PERFORMANCE LIQUID CRYSTALLINE POLYMERS

CROSS-REFERENCE TO RELATED APPLICATIONS

This application claims priority to U.S. Provisional Application Serial No. 60/234,071 filed Sep. 20, 2000 which is incorporated herein by reference in their entirety.

BACKGROUND OF THE INVENTION

This disclosure relates to processes for making high temperature, high performance thermoplastic films and film laminate materials, particularly, isotropic liquid crystalline films and film laminate materials.

Liquid crystalline polymers are a family of materials that exhibit a highly ordered structure in the melt, solution, and solid states. They can be broadly classified into two types: lyotropic, having liquid crystalline properties in the solution state, and thermotropic, having liquid crystalline properties in the melted state. Most liquid crystalline polymers exhibit excellent physical properties such as high strength, good heat resistance, low coefficient of thermal expansion, good electrical insulation characteristics, low moisture absorption, and are good barriers to gas flow. Such properties make them useful, in sheet form, as substrate materials for printed circuit boards, packaging, integrated circuit (IC) chip packages circuitry and other high density applications.

Many of the physical properties of liquid crystalline polymers are very sensitive to the amount and direction of orientation of the liquid crystal regions in the polymer. The structure of the liquid crystalline polymer is easily ordered and oriented by shear forces occurring during extrusion, often leading to highly aligned liquid crystal chains that are retained in the solid state and result in highly anisotropic properties. Anisotropic properties are not desirable, however, in products having planar forms, such as tapes, films, sheets, and the like. Thus it is desirable, especially in circuit boards and other high density applications, to use a substantially or fully isotropic (non-ordered) liquid crystalline polymers.

A number of methods are used to produce liquid crystalline polymers in planar forms that have more balanced, less anisotropic properties. These include the use of multilayer flat dies that are oriented so as to extrude overlapping layers at intersecting angles, use of static mixer-agitators at the die inlets, and the like. More recently, dies having rotating or counter-rotating surfaces have been used. These extrusion techniques, used separately or in combination with other methods known in the art, such as film blowing, can produce liquid crystalline polymer film and sheet that are multiaxially oriented, that is, oriented in more than one direction, and have more balanced physical properties.

A characteristic of these methods is that locally, for example at the surfaces of the sheet or film, the molecules are oriented in the planar x-y directions by shear imparted at the extrusion surfaces. Thus, when examining the film in the z-direction, i.e., the thickness, the x-y orientation of the molecules will change progressively from one orientation (e.g., in the x direction) at one surface to another orientation (e.g., the y direction) at the opposite surface of the planar form. A drawback to the above described methods is that when attempting to make very thin multiaxially oriented films, e.g., films having a thickness of 25 micrometers or less, the forces imparted in the orientation transition region of the liquid crystalline polymer by the extrusion surfaces are exerted in increasingly opposing directions as the distance between the extrusion surfaces diminishes. This results in the formation of pinholes, tears, and other imperfections, for example, separation of surface layers (peeling) of the film. Additionally, such films are not fully isotropic.

Accordingly, there remains a need in the art for a process to produce liquid crystalline polymer films that are isotropic in the x-y plane, especially films with thicknesses less than about 25 micrometers.

SUMMARY OF THE INVENTION

The above discussed and other drawbacks and deficiencies of the prior art are overcome or alleviated by a process to produce a liquid crystalline polymer film comprising depositing a fine powder of liquid crystalline polymer resin onto a carrier and fusing the deposited fine powder to form a liquid crystalline polymer film that is isotropic in the x-y plane. The liquid crystalline polymer resin powder may be applied by electrostatic deposition. The carrier can comprise an all-metal foil, a metal foil laminate, a polymer film material, or a release material.

In one embodiment, the carrier is removed to result in a free standing liquid crystalline polymer film. The free standing liquid crystalline polymer film may be subsequently applied to a substrate and laminated by heat and pressure.

In another embodiment, the carrier is not removed and the liquid crystalline polymer film is laminated to the carrier by heat and pressure.

In another embodiment the liquid crystalline polymer film/carrier material is applied to a substrate and laminated by heat and pressure to form a liquid crystalline polymer film disposed between the carrier and the substrate, often known in the industry as bi-cladded laminates.

The above-discussed and other features and advantages of the present invention will be appreciated and understood by those skilled in the art from the following detailed description and drawings.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

Figure 1:
FIG. 1 depicts a liquid crystalline polymer film disposed on a carrier.

A process to produce liquid crystalline polymer film that is isotropic in the x-y plane comprises electrostatically depositing a fine powder of liquid crystalline polymer resin onto a carrier. The electrostatic deposition of the resin particles results in a substantially random molecular alignment of the liquid crystalline polymer. The liquid crystalline polymer powder may optionally comprise filler. After deposition the liquid crystalline polymer powder is fused by heat, pressure or a combination of heat and pressure to form a film. In an important feature, fusing is under conditions effective to produce a liquid crystalline polymer film that is isotropic in the x-y plane. The film may then be removed from the carrier, or laminated to the carrier and then used.

Isotropic in the x-y plane is herein defined as having a coefficient of thermal expansion in the x-direction that differs from the coefficient of thermal expansion in the y-direction by less than or equal to about 10 parts per million (ppm), preferably by less than or equal to about 8 ppm, and more preferably by less than or equal to about 5 ppm.

Liquid crystalline polymers are known polymers, and are sometimes described as "rigid-rod", "rod-like", or ordered polymers. These polymers are believed to have a fixed molecular shape, e.g. linear, or the like, due to the nature of the repeating units comprising the polymeric chain. The repeating units typically comprise rigid molecular elements. The rigid molecular elements (mesogens) are frequently rod-like or disk-like in shape and are typically aromatic and frequently heterocyclic. The rigid molecular elements may be present in either the main chain (backbone) of the polymer or in the side chains. When present in the main chain or in the side chains they may be separated by more flexible molecular elements, sometimes referred to as spacers.

Liquid crystalline polymers can be blended with polymers that are not liquid crystalline polymers, hereinafter referred to as non-liquid crystalline polymers. These blends are sometimes referred to as polymer alloys. Some of these blends have processing and functional characteristics similar to liquid crystalline polymers and are thus included within the scope of the present invention. The non-liquid crystalline polymers and liquid crystalline polymer components are generally mixed in a weight ratio of 10:90 to 90:10, preferably in the range of 30:70 to 70:30. Hereinafter the term liquid crystalline polymer will include liquid crystal polymer blends.

Both thermotropic and lyotropic liquid crystalline polymers are useful. Furthermore, useful liquid crystalline polymers can be thermoplastic or thermosetting. Suitable thermotropic liquid crystalline polymers include liquid crystal polyesters, liquid crystal polycarbonates, liquid crystal polyetheretherketone, liquid crystal polyetherketoneketone and liquid crystal polyester imides, specific examples of which include (wholly) aromatic polyesters, polyester amides, polyamide imides, polyester carbonates, and polyazomethines.

Useful thermotropic liquid crystalline polymers also include polymers comprising a segment of a polymer capable of forming an anisotropic molten phase as part of one polymer chain thereof and a segment of a polymer incapable of forming an anisotropic molten phase as the rest of the polymer chain, and also a composite of a plurality of thermotropic liquid crystalline polymers.

Representative examples of the monomers usable for the formation of the thermotropic liquid crystalline polymer include:

(a) at least one aromatic dicarboxylic acid compound, (b) at least one aromatic hydroxy carboxylic acid compound, (c) at least one aromatic diol compound, (d) at least one of an aromatic dithiol ($d_1$), an aromatic thiophenol ($d_2$), and an aromatic thiol carboxylic acid compound ($d_3$), and (e) at least one of an aromatic hydroxyamine compound and an aromatic diamine compound.

They may sometimes be used alone, but may frequently be used in a combination of monomers (a) and (c); (a) and (d); (a), (b) and (c); (a), (b) and (e); (a), (b), (c) and (e); or the like.

Examples of the aromatic dicarboxylic acid compound (a) include aromatic dicarboxylic acids such as terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and 1,6-naphthalenedicarboxylic acid; and alkyl-, alkoxy- and halogen-substituted derivatives of the above-mentioned aromatic dicarboxylic acids, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the aromatic hydroxy carboxylic acid compound (b) include aromatic hydroxy carboxylic acids such as 4-hydroxybenzoic acid, 3-hydroxybenzoic acid, 6-hydroxy-2-naphthoic acid, and 6-hydroxy-1-naphthoic acid; and alkyl-, alkoxy-and halogen-substituted derivatives of the aromatic hydroxy carboxylic acids, such as 3-methyl-4-hydroxybenzoic acid, 3,5-dimethyl-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic diol compound (c) include aromatic diols such as 4,4'-dihydroxydiphenyl, 3,3'-dihydroxydiphenyl, 4,4'-dihydroxytriphenyl, hydroquinone, resorcinol, 2,6-naphthalenediol, 4,4'-dihydroxydiphenyl ether, bis(4-hydroxyphenoxy) ethane, 3,3'-dihydroxydiphenyl ether, 1,6-naphthalenediol, 2,2-bis(4-hydroxyphenyl)propane, and bis(4-hydroxyphenyl) methane; and alkyl-, alkoxy- and halogen-substituted derivatives of the aromatic diols, such as chlorohydroquinone, methylhydroquinone, t-butylhydroquinone, phenylhydroquinone, methoxyhydroquinone, phenoxyhydroquinone, 4-chlororesorcinol, and 4-methylresorcinol.

Examples of the aromatic dithiol ($d_1$) include benzene-1,4-dithiol, benzene-1,3-dithiol, 2,6-naphthalene-dithiol, and 2,7-naphthalene-dithiol.

Examples of the aromatic thiophenol ($d_2$) include 4-mercaptophenol, 3-mercaptophenol, and 6-mercaptophenol.

Examples of the aromatic thiol carboxylic acid ($d_3$) include 4-mercaptobenzoic acid, 3-mercaptobenzoic acid, 6-mercapto-2-naphthoic acid, and 7-mercapto-2-naphthoic acid.

Examples of the aromatic hydroxyamine compound and the aromatic diamine compound (e) include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

Thermotropic liquid crystalline polymers are prepared from monomer(s) as mentioned above by a variety of esterification methods such as melt acidolysis or slurry polymerization, or the like methods.

The molecular weight of the thermotropic liquid crystalline polyester that may favorably be used may be about 2,000 to 200,000, preferably 4,000 to 100,000. The measurement of the molecular weight may be done, for example, either through determination of the terminal groups of a compressed film thereof according to infrared spectroscopy, or by gel permeation chromatography (GPC).

Thermotropic liquid crystalline polymers may be used either alone or in mixture of at least two thereof. A preferred thermotropic liquid crystalline polymer is 2-naphthalene carboxylic acid, 6-(acetyloxy)-polymer with 4-(acetyloxy) benzoic acid.

Suitable lyotropic liquid crystalline polymers include concentrated sulfuric acid solutions of poly(p-phenylene terephthalamide) (PPTA), silk fibroin aqueous solutions, and sericin aqueous solutions. A PPTA liquid crystalline polymer is represented by Formula I:

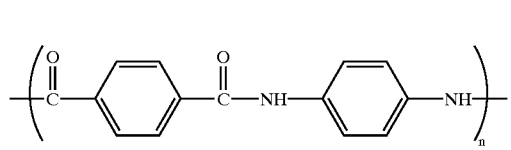

Possible liquid crystalline polymers which can be used with the present invention include, but are not limited to VECTRA®, commercially available from Ticona, XYDAR®, commercially available from Amoco Polymers, and ZENITE®, commercially available from DuPont, among others. An especially preferred liquid crystalline polymer film is based on copolymer of hydroxy benzoate/hydroxy naphthoate, known commercially as VECSTAR®, available from Kuraray Co., Ltd., Japan. The liquid crystalline polymers and polymer blends described hereinabove are meant for illustration and not for limitation, as many other suitable liquid crystalline polymers and polymer blends are known in the art. Likewise, it is recognized that compatibilizers, plasticizers, flame retardant agents, and other additives may be contained in the liquid crystalline polymers. These additives may be added to the liquid crystalline polymer during production of the liquid crystalline polymer resin or added to the liquid crystalline polymer resin by methods known in the art.

The liquid crystalline polymer film may also comprise particulate filler material. The particulate filler material can be an organic or inorganic material having a melt temperature higher than the liquid crystalline polymer with which it is mixed. The particulate filler material is typically dry blended with the liquid crystalline polymer resin. Alternatively, the particulate filler material may be mixed with the liquid crystalline polymer during production of the liquid crystalline polymer resin. Suitable inorganic fillers include, but are not limited to, silica, alumina, titanium oxide, and other metal oxides; carbonates, such as calcium carbonate and barium carbonate; sulfates, such as calcium sulfate and barium sulfate; titanates, such as potassium titanate and calcium titanate; talc, clay, mica, glass, and other silicates; aluminum nitride and borax. "Particulate" as used herein includes individual particles of any aspect ratio and thus includes fibers and powders. Examples of suitable organic filler particles include, carbon, graphite, and high melt-temperature resin powders of synthetic polymers such as polyimides, polyetherimides, polyamideimides, polyetheretherketones, and fluoropolymers such as polytetrafluoroethylene (PTFE), tetrafluoroethylene-hexafluoropropylene copolymer (FEP), tetrafluoroethylene-(perfluoroalkyl) vinyl ether copolymer (PFA), ethylene/tetrafluoroethylene copolymer (ETFE), polytrichlorofluoroethylene (CTFE), polyvinylidene fluoride (PVDF), and the like. Additionally the liquid crystalline polymer film may include combinations of fillers as taught in U.S. Pat. No. 5,844,036, which is incorporated by reference herein.

The particulate filler material preferably has a mean particle size of about 0.01 to 50 micrometers, preferably of about 0.1 to 10 micrometers. The concentration of particulate material in the liquid crystalline polymer film may be 0 weight percent (wt %) to about 60 wt %, preferably about 5 wt % to about 25 wt % based on the total weight of the liquid crystalline polymer film.

The liquid crystalline polymer is applied to the carrier in fine powder form. The liquid crystalline polymer fine powder can be purchased commercially or obtained by grinding the liquid crystalline polymer resin. Preferably the particle size of the liquid crystalline polymer fine powder is less than about 1 micrometer, more preferably less than about 0.1 micrometer, and most preferably about 0.01 to about 0.1 micrometers.

The carrier can be any material capable of supporting the liquid crystalline polymer during deposition and that preferably does not adversely affect the liquid crystalline polymer. Examples of useful carriers include metal foils, metal foil laminates, polymer films or release materials. Metals foils include foils with a thickness of about 9 micrometers to about 70 micrometers made from copper, aluminum, iron, nickel, silver, aluminum, zinc, manganese, and alloys comprising at least one of the foregoing materials. Metal foil laminates are thin layers of metal, typically less than about 10 micrometers, laminated to a polymer film. The metal component of the metal film laminate can be copper, copper alloy and other electrically conductive metals and alloys typically used in the circuit industry, including, but not limited to, iron, nickel, silver, aluminum, zinc, manganese, and alloys comprising at least one of the foregoing materials. Polymer films used in metal film laminates include polybutyleneterephthalate, polyester, polyimide, polypropylene, polyurethane, and vinyl polymers among others.

Polymer films useful as carriers have sufficient temperature resistance and strength to retain integrity under the conditions employed in the manufacture of the liquid crystalline polymer film. Polymer films useful as carriers include polytetrafluoroethylene (PTFE) and polyimide, among others.

Release materials generally comprise a backing layer and a coating. Release materials bind to an applied layer so as to allow easy, one piece removal of the applied layer but bind to the applied layer with enough strength to prevent the applied layer from slipping off the release material. The backing layer provides support and is covered with the coating, which facilitates release of the applied layer. Examples of useful release materials are stainless steel, shiny copper foil or other suitable metals with zinc, chrome, or silicone coatings.

The liquid crystalline polymer fine powder is deposited on the carrier by methods that allow randomization of the molecular alignment of the liquid crystalline polymer molecules. One such method is electrostatic deposition. When using electrostatic deposition the carrier is kept at ground potential. The liquid crystalline polymer fine powder particles are charged by an electrode in the nozzle, and a charged spray cloud from the nozzle is attracted to the carrier by the high voltage difference. In order to maximize the random orientation of the liquid crystalline polymer during electrostatic deposition rotating spray nozzles and/or randomized E-fields may be used.

Fusion, after the liquid crystalline polymer fine powder particles have been applied, may be accomplished by heat or a combination of heat and pressure. Fusion can be accomplished by either a partial melt approach or a softened polymer approach.

In partial melt the carrier is heated to temperature effective to achieve partial melt of the liquid for a time effective to form the film, yet maintain the isotropic nature of the film. Fusion of certain liquid crystalline polymers may require the use of pressure in combination with heat. Useful conditions are dependent upon the choice of carrier and liquid crystalline polymer and are readily determined by one of ordinary skill in the art. Typically, however, the pressure can be in the range of about 50 pounds per square inch (psi)(0.3 megapascals (Mpa)) to about 400 psi (3 Mpa). Partial melt is preferably carried out in a continuous roll fashion. Optionally, fusion by partial melt and lamination to the carrier can be performed together by the use of pressure and heat.

The softened polymer approach differs from the partial melt in that the liquid crystalline resin powder is heated to a temperature effective to soften it to workability, typically about 5–10° C. degrees below its melting point. The conditions of the softened polymer approach maintain the isotropic nature of the film. Similar to partial melt, fusion of some liquid crystalline polymers may require the use of pressure in addition to heat. The conditions employed will depend upon the choice of liquid crystalline polymer and carrier and are readily determined by one of ordinary skill in the art. Useful pressures are similar to those employed in combination with partial melt. The softened polymer approach is preferably carried out in a continuous roll to roll fashion. Optionally, fusion by the softened polymer approach and lamination to the carrier can be performed together by the use of pressure in addition to heat.

The resulting thickness of the liquid crystalline polymer film is about 5 micrometers to about 100 micrometers with about 25 micrometers preferred. The above described process produces a thin, fully isotropic, defect-free film on the carrier. Without being bound by theory, it is believed that the thickness of the resulting liquid crystalline polymer film is dependent, in part, on the particle size of the liquid crystalline resin powder. Theoretically, smaller particle sizes should result in thinner films. Other factors influencing the thickness of the liquid crystalline polymer film include the pressure and temperature employed in fusing the liquid crystalline polymer particles.

Once the liquid crystalline polymer has been applied to the carrier and fused, the resulting liquid crystalline polymer film/carrier may be laminated together; the carrier may be removed from the liquid crystalline polymer film to yield in a free standing liquid crystalline polymer film, which can then be optionally laminated to a substrate; or the liquid crystalline polymer film/carrier material may be itself laminated to a substrate. Possible substrate layers include metal foils, metal foil laminates, or polymer films as described above.

Possible laminating methods include, but are not limited to, a lamination press, autoclave, and continuous roll-to-roll lamination, among others, with the preferred method based upon the type of liquid crystalline polymer employed (thermosetting or thermoplastic).

Figure 2:
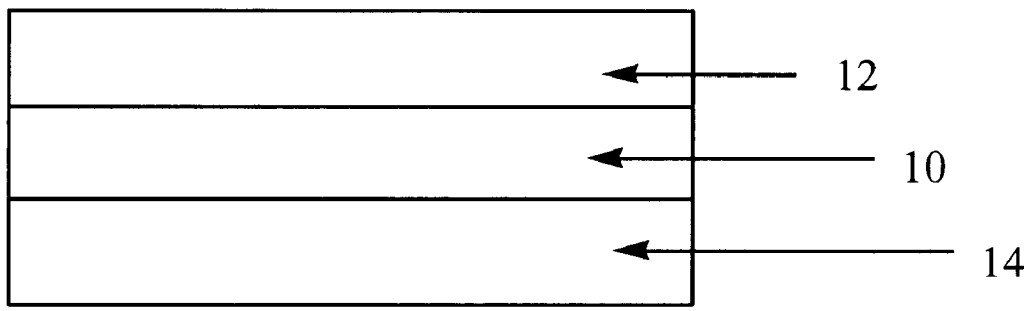
FIG. 2 depicts a liquid crystalline polymer film disposed between a carrier and a substrate.

Turning now to the various Figures, FIG. 1 depicts a liquid crystalline polymer film 10 disposed on a carrier 12. FIG. 2 depicts a liquid crystalline polymer film 10 disposed between a carrier 12 and a substrate 14.

The invention is further illustrated by the following non-limiting Examples.

EXAMPLES

Example 1

Liquid crystalline polymer resin powder (VECTRA®-E950i from Ticona Corporation, average particle size below 150 micrometers) was electrostatically deposited onto a 16-inch wide electrodeposited copper foil (0.5 ounce NT-TAX-M-THE from Yates Foil USA) at a line speed of 6 feet per minute. The voltage applied to electrostatically charge the air/liquid crystalline polymer mixture was −14.9 kilovolts (kV) to −37.0 kV. The airflow was controlled to between 800–1000 cubic feet per hour. After the liquid crystalline polymer resin powder was applied to the copper it was then fused by passing through a series of six heaters maintained at temperatures between 399° C. and 440° C. The resulting liquid crystalline polymer film/copper was laminated at 355° C. and 200 pound per square inch (psig). The resulting laminate was then tested for coefficient of thermal expansion (CTE) according to test method ASTM D-696, and for tensile strength, tensile modulus, and percent elongation according to test method IPC-TM-650, method 2.4.19. Results are shown in Table 1.

TABLE 1

| Property | X direction | Y direction |
|---|---|---|
| CTE (ppm/° C. over −50° C. to 50° C.) | 22.3 | 20.7 |
| Thickness (10³ in/micrometers) | 1–3/25–75 | 1–3/25–75 |
| Tensile Strength (Kpsi/MPa) | 3.6/24.5 | 1.4/9.8 |
| Tensile Modulus (Kpsi/Mpa) | 237.7/1638.6 | 204.0/1406.3 |
| Elongation (%) | 3 | 2 |

Example 2

Using the electrodeposition conditions described in Example 1, liquid crystalline polymer resin powder, VECTRA®-E950i, as well as two comparative, non-liquid crystalline polymer high temperature thermoplastic resin powders, Aurum PD-400 available from Mitsui Chemicals and OxPEKK SP-PC available from Oxford Polymers were applied to 0.5 ounce copper foil (NT-TAX-M-THE from Yates Foil USA) The average particle size of the resin powders was below 150 micrometers. The resulting laminate was tested for tensile strength, tensile modulus and elongation using the same test methods employed in Example 1. The laminates were also tested for bond strength according to IPC-TM 650, method 2.4.8.5. Results are shown in Table 2.

TABLE 2

|  | Vectra E950i | | Aurum PD-400 | | OxPEKK SP-PC | |
| --- | --- | --- | --- | --- | --- | --- |
| Thickness (10$^3$ in/micrometers), with ½ Oz Copper | 1.74/44 | | 1.51/39 | | 2.27/58 | |
| Thickness Uniformity (%) | 8.9 | | 16.6 | | 14.9 | |
| | X direction | Y direction | X direction | Y direction | X direction | Y direction |
| Tensile Strength (Kpsi/MPa) | 4.2/29.3 | 2.5/17.6 | — | — | 3.8/26.4 | 4.9/33.9 |
| Tensile Modulus (Kpsi/MPa) | 236.6/1630.0 | 267.8/1850.0 | — | — | 359.7/2480.0 | 364.0/2510.0 |
| Elongation (%) | 4 | 4 | — | — | 2 | 1.5 |
| Bond Strength (pli)/(Kg/cm) | 2.1/0.4 | — | — | — | 3.1/0.6 | — |

As can be seen by comparing the CTE, tensile strength, tensile modulus and elongation in Table 2, the mechanical properties of the electrostatically deposited liquid crystalline polymer film are comparable to other high temperature thermoplastics.

The foregoing description and examples demonstrate that it is now possible to prepare a liquid crystalline polymer film that is isotropic in the x-y directions with a thickness of about 25 micrometers or less. Such a material has heretofore been desired, especially for use in circuit materials, flexible circuit materials, and vapor/gas barrier layers, but unattainable.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A process to produce a liquid crystalline polymer film that is isotropic in the x-y plane comprising
   electrostatically depositing a fine powder of liquid crystalline polymer resin onto a carrier comprising a metal foil having a thickness of about 9 micrometers to about 70 micrometers; and
   fusing the deposited fine powder to form a liquid crystalline polymer film,
wherein the coefficient of thermal expansion in the x direction differs from the coefficient of thermal expansion in the y direction by less than or equal to about 10 parts per million.

2. The process of claim 1, further comprising laminating the liquid crystalline polymer film to the carrier.

3. The process of claim 1, further comprising disposing a substrate adjacent to the liquid crystalline polymer film and laminating the substrate, liquid polymer film and carrier.

4. The process of claim 1 wherein the metal foil is a copper foil.

5. The process of claim 1 wherein the metal foil is in the form of a laminate.

6. The process of claim 5 wherein the laminate comprises the metal foil disposed on a polymer film material.

7. The process of claim 1 wherein the carrier further comprises a release material.

8. The process of claim 7 further comprising removing the liquid crystalline polymer film from the carrier.

9. The process of claim 1 wherein the fine powder of liquid crystalline polymer resin comprises a thermotropic liquid crystalline polymer.

10. The process of claim 1 wherein the fine powder of liquid crystalline polymer resin comprises a lyotropic liquid crystalline polymer.

11. The process of claim 1 wherein the fine powder of liquid crystalline polymer resin comprises a copolymer of hydroxy benzoate/hydroxy naphthoate.

12. The process of claim 1 wherein the fine powder of liquid crystalline polymer resin comprises particles less than about 1 micrometer in size.

13. The process of claim 12, wherein the particles are less than about 0.1 micrometer in size.

14. The process of claim 13, wherein the particles are about 0.01 to about 0.1 micrometer in size.

15. The process of claim 1 wherein the liquid crystalline polymer film further comprises solid particulate filler material.

16. The process of claim 15 wherein the solid particulate filler material is organic particulate filler material.

17. The process of claim 15 wherein the solid particulate filler material is inorganic particulate filler material.

18. The process of claim 1, wherein the liquid crystalline polymer resin is electrostatically deposited using rotating spray nozzles.

19. The process of claim 1, wherein the liquid crystalline polymer resin is electrostatically deposited using randomized E fields.

20. The process of claim 1, wherein fusing the deposited fine powder comprises the application of heat.

21. The process of claim 20, wherein fusing further comprises the application of pressure.

22. The process of claim 21, wherein the amount of pressure is about 50 pounds per square inch to about 400 pounds per square inch.

23. The process of claim 1, wherein the coefficient of thermal expansion in the x-direction differs from the coefficient of thermal expansion in the y-direction by less than or equal to about 8 parts per million.

24. The process of claim 1, wherein the coefficient of thermal expansion in the x-direction differs from the coefficient of thermal expansion in the y-direction by less than or equal to about 5 parts per million.

25. The process of claim 1, wherein the thickness of the liquid crystalline polymer film is about 5 micrometers to about 100 micrometers.

26. A liquid crystalline polymer film produced by a method comprising
   electrostatically depositing a fine powder of liquid crystalline polymer resin onto a carrier comprising a metal foil having a thickness of about 9 micrometers to about 70 micrometers; and fusing the deposited fine powder to form a liquid crystalline polymer film, wherein the coefficient of thermal expansion in the x-direction differs from the coefficient of thermal expansion in the y-direction by less than or equal to about 10 parts per million.

27. The film of claim 26 wherein the metal foil is a copper foil.

28. The film of claim 26 wherein the metal foil is in the form of a laminate comprising the metal foil and a polymer film.

29. The film of claim 26 wherein the carrier further comprises a release material.

30. The film of claim 26 wherein the fine powder of liquid crystalline polymer resin comprises a thermotropic liquid crystalline polymer.

31. The film of claim 26 wherein the fine powder of liquid crystalline polymer resin comprises a copolymer of hydroxy benzoate/hydroxy naphthoate.

32. The film of claim 26 wherein the fine powder of liquid crystalline polymer resin comprises particles less than about 1 micrometer in size.

33. The film of claim 32 wherein the particles are less than about 0.1 micrometer in size.

34. The film of claim 32, wherein the particles are about 0.01 to about 0.1 micrometer in size.

35. The film of claim 26 wherein the liquid crystalline polymer film further comprises solid, particulate, inorganic filler material.

36. The film of claim 26, wherein the liquid crystalline polymer resin is electrostatically deposited using randomized E fields.

37. The film of claim 26, wherein the coefficient of thermal expansion in the x-direction differs from the coefficient of thermal expansion in the y-direction by less than or equal to about 5 parts per million.

38. The film of claim 26, wherein the thickness of the liquid crystalline polymer film is about 5 micrometers to about 100 micrometers.

39. A liquid crystalline polymer composite material comprising
a liquid crystalline polymer film with a thickness of about 100 micrometers or less disposed on a carrier comprising a metal foil having a thickness of about 9 micrometers to about 70 micrometers, wherein the liquid crystalline polymer film has a coefficient of thermal expansion in the x-direction that differs from the coefficient of thermal expansion in the y-direction of the liquid crystalline polymer film by less than or equal to about 10 parts per million.

40. The composite material of claim 39 wherein the metal foil is a copper foil.

41. The composite material of claim 39, wherein the thickness of the liquid crystalline polymer film is about 5 micrometers to about 100 micrometers.

42. The composite material of claim 39, wherein the coefficient of thermal expansion in the x-direction differs from the coefficient of thermal expansion in the y-direction by less than or equal to about 5 parts per million.

43. The composite material of claim 39 wherein the metal foil is in the form of a laminate comprising the metal foil and a polymer film material.

44. The composite material of claim 39 wherein the carrier further comprises a release material.

45. The composite material of claim 39 wherein the liquid crystalline polymer resin comprises a copolymer of hydroxy benzoate/hydroxy naphthoate.

46. The composite material of claim 39 wherein the liquid crystalline polymer film further comprises solid, particulate, inorganic filler material.

* * * * *